United States Patent
Blatt et al.

(10) Patent No.: US 10,685,018 B1
(45) Date of Patent: Jun. 16, 2020

(54) METHODS AND APPARATUS FOR COMPUTING ESTIMATED QUANTILES FOR STREAMING DATA OVER SLIDING WINDOWS

(71) Applicant: EMC IP Holding Company LLC, Hopkinton, MA (US)

(72) Inventors: Marcelo Blatt, Modiin (IL); Rafael Shachar, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 675 days.

(21) Appl. No.: 15/192,165

(22) Filed: Jun. 24, 2016

(51) Int. Cl.
*G06F 16/00* (2019.01)
*G06F 16/2453* (2019.01)
*G06F 16/2458* (2019.01)

(52) U.S. Cl.
CPC .... *G06F 16/24539* (2019.01); *G06F 16/2474* (2019.01)

(58) Field of Classification Search
None
See application file for complete search history.

(56) References Cited

U.S. PATENT DOCUMENTS

| | | | |
|---|---|---|---|
| 8,478,688 B1 | 7/2013 | Villa et al. | |
| 8,782,368 B2* | 7/2014 | Lillibridge | G06F 3/0608 711/162 |
| 2010/0153064 A1* | 6/2010 | Cormode | G06F 17/18 702/179 |
| 2011/0122887 A1* | 5/2011 | Ma | H04L 47/6255 370/413 |
| 2013/0276125 A1* | 10/2013 | Bailey | H04L 63/1433 726/25 |
| 2016/0103559 A1* | 4/2016 | Maheshwari | G06F 17/30548 715/738 |

(Continued)

OTHER PUBLICATIONS

"Practical Time Decay Model for Streaming Systems" Graham Cormode et al, p. 3, col. 1, paragraph II (Year: 2008).*

(Continued)

*Primary Examiner* — Tarek Chbouki
(74) *Attorney, Agent, or Firm* — Ryan, Mason & Lewis, LLP

(57) ABSTRACT

Estimated quantiles and/or percentiles for streaming data are computed over a sliding window. An exemplary method comprises obtaining a stream of data values; obtaining a summary of a distribution of previously processed data values; adding streamed data values to a buffer; and when the buffer reaches a predefined fullness threshold, performing the following steps: processing tuples in the summary to apply a decay function to each tuple using the number of items in the stream in the stream at the time the tuple is created and a minimal rank bound; for each item in the buffer, creating a tuple; adding the tuple to the summary, and removing the item from the buffer; and building a search tree that is used to process one or more of percentile queries and quantile queries. The summary is optionally compressed by merging consecutive tuples that satisfy a predefined invariant constraint. The decay function maintains, for example, one or more of a predefined recent number of items or a predefined recent time window of items in the summary.

22 Claims, 5 Drawing Sheets

(56) References Cited

U.S. PATENT DOCUMENTS

| | | | |
|---|---|---|---|
| 2016/0103665 A1* | 4/2016 | Liu | G06F 11/3644 |
| | | | 717/158 |
| 2017/0329720 A1* | 11/2017 | Bedi | G06F 12/123 |
| 2018/0082222 A1* | 3/2018 | Fox | G06Q 30/0206 |

OTHER PUBLICATIONS

G. Cormode et al., Effective Computation of Biased Quantiles over Data Streams, in IEEE Int'l Conf. on Data Engineering (ICDE) 2005.

M. Greenwald and S. Khanna, Space Efficient Online Computation of Quantile Summaries, Proc. of ACM SIGMOD, 58-66 (2001).

A. Arasu and G.S. Manku, Approximate Counts and Quantiles Over Sliding Windows, Proc. of 23d ACM SIGMOD-SIGART Symposium on Principles of Database Systems (PODS) (2004).

X. Lin et al. Continuously Maintaining Quantile Summaries of the Most Recent N Elements over a Data Stream, Proc. of the 20th Int'l Conf. on Data Engineering (Jun. 2001).

\* cited by examiner

METHODS AND APPARATUS FOR COMPUTING ESTIMATED QUANTILES FOR STREAMING DATA OVER SLIDING WINDOWS

FIELD

The field relates generally to techniques for determining estimated quantiles and/or percentiles for streaming data.

BACKGROUND

In many applications, such as online authentication and cyber security, the value of a specific risk score is hard to interpret and should be considered in the relative context of the population and/or the user/entity history. In other words, it is necessary to compare the risk score with the relevant score distribution. In this way, the risk involved in a specific event (e.g., a financial transaction, login attempt, or a server access) is determined by the percentile of the risk score.

Quantiles divide the range of a distribution into contiguous intervals with substantially equal probabilities. Computing the quantile for the tail of the distribution in the settings of large data streams is known as a hard problem, where naïve approaches are not feasible. Computing estimated quantiles allows a quantile query to be answered in a space efficient manner. In the targeted quantile problem, the accuracy of the quantile estimation varies for different percentiles. In security applications, for example, high accuracy is desired at the tip of the distribution (typically associated with higher security threats) while moderate accuracy is sufficient at the center of the distribution. This relaxation of the quantile problem allows a further reduction in the space requirements of the algorithm. Finally, the distribution of values may change over time.

A need remains for an improved algorithm for estimating quantiles and/or percentiles over streaming data, where streaming data cannot be stored and processed afterwards.

SUMMARY

One or more illustrative embodiments of the present invention provide methods and apparatus for computing estimated quantiles and/or percentiles for streaming data over a sliding window. In one exemplary embodiment, a method comprises the steps of obtaining a stream of data values; obtaining a summary of a distribution of previously processed data values, wherein the data values are stored in the summary as a tuple, wherein a given tuple, $t_i$, comprises a given data value, an item count, a difference value based on a size of the summary at a time the tuple is created, a number of items in the stream at the time the tuple is created, and a minimal rank bound of tuple i−1; adding streamed data values to a buffer; and when the buffer reaches a predefined fullness threshold, performing the following steps: processing tuples in the summary to apply a decay function to each tuple using the number of items in the stream and the minimal rank bound; for each item in the buffer, creating a tuple; adding the tuple to the summary, and removing the item from the buffer; and building a search tree that is used to process one or more of percentile queries and quantile queries.

In one or more embodiments, the step of building the search tree further comprises, for each tuple in the summary, having a given data value, $v_i$, adding an entry to the search tree of the form ($v_i$, percentile($v_i$)). The summary is optionally compressed by merging consecutive tuples that satisfy a predefined invariant constraint.

In at least one embodiment, the decay function maintains one or more of a predefined recent number of items or a predefined recent time window of items in the summary. The decay function optionally comprises an exponential decay function based on a window size and a time since a last update of the summary.

The methods and devices of the illustrative embodiments overcome one or more of the problems associated with the conventional techniques for estimating quantiles and/or percentiles over streaming data, such as risk scores, and provide improved space-efficiency for estimating quantiles over a sliding window. These and other features and advantages of the present invention will become more readily apparent from the accompanying drawings and the following detailed description.

DETAILED DESCRIPTION

Figure 1:
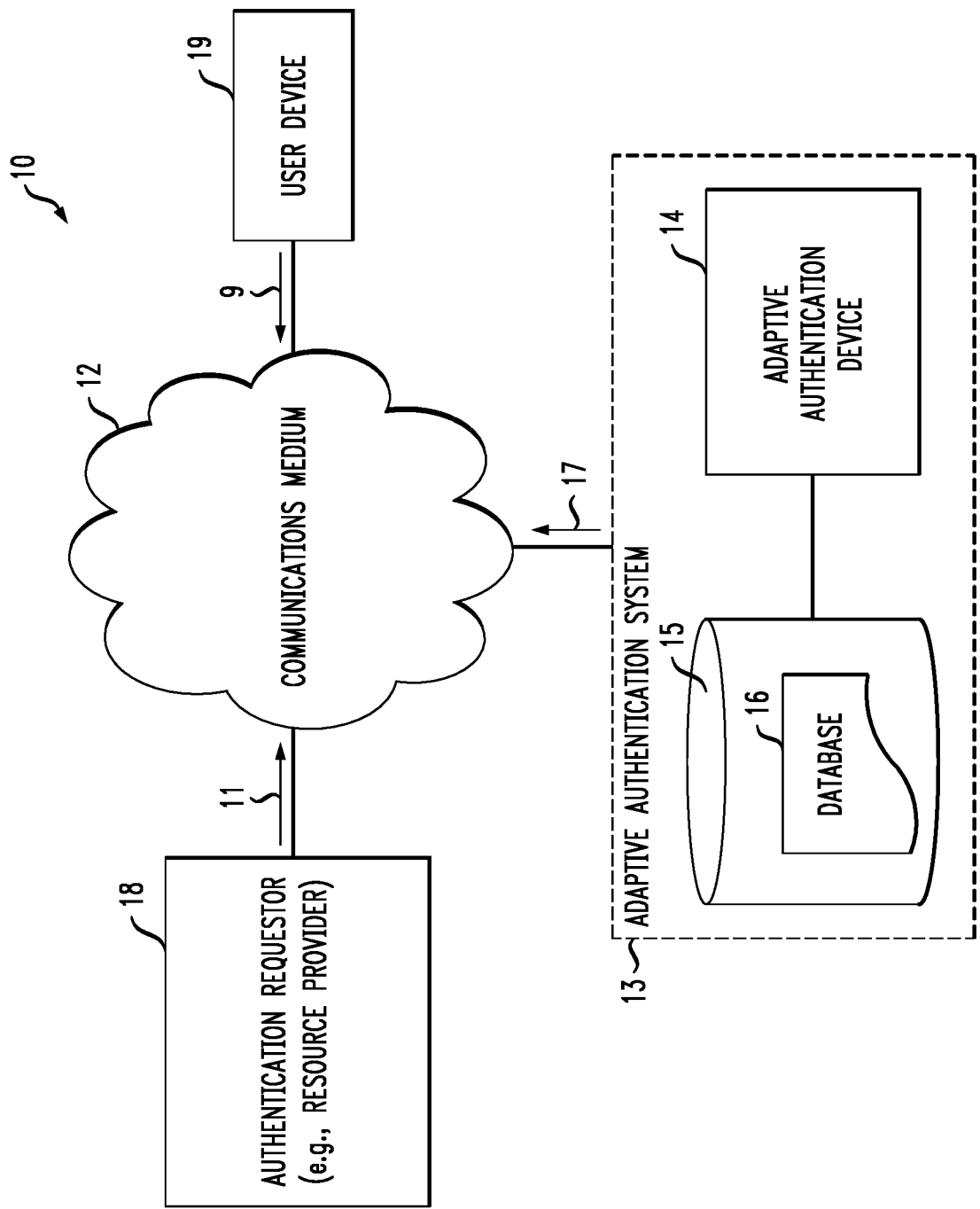
FIG. 1 illustrates an electronic environment in which the present invention may be employed.

Illustrative embodiments of the present invention will be described herein with reference to exemplary communication, storage and processing devices. It is to be appreciated, however, that the invention is not restricted to use with the particular illustrative configurations shown. As will be described, the present invention in one or more illustrative embodiments provides a space-efficient algorithm for estimating quantiles and/or percentiles over a sliding window. While one or more exemplary embodiments are described in the context of a risk engine that generates risk scores for purposes of fraud detection, the disclosed techniques can be employed in other systems that estimate quantiles and/or percentiles over streaming data, as would be apparent to a person of ordinary skill in the art.

One or more embodiments of the invention provide a space-efficient algorithm for estimating quantiles and/or percentiles over a sliding window. One exemplary implementation is based on a targeted quantile algorithm described in G. Cormode et al., "Effective Computation of Biased Quantiles over Data Streams," in IEEE Int'l Conf. on Data Engineering (ICDE) 2005, incorporated by reference herein in its entirety, and referred to herein as the CKMS algorithm. At least one embodiment of the invention extend the CKMS algorithm to support the sliding window scenario.

Generally, M. Greenwald and S. Khanna, "Space Efficient Online Computation of Quantile Summaries," Proc. of ACM SIGMOD, 58-66 (2001), incorporated by reference herein in its entirety, describes an algorithm for computing estimated quantiles (often referred to as the GK algorithm) by maintaining a summary of the distribution of items using a small in-memory data structure.

The CKMS algorithm, referenced above, extends the GK algorithm for the biased and targeted quantile problems. A. Arasu and G. S. Manku, "Approximate Counts and Quantiles Over Sliding Windows," Proc. of 23d ACM SIGMOD-SIGACT-SIGART Symposium on Principles of Database Systems (PODS) (2004), incorporated by reference herein in its entirety, proposed a variant for the GK algorithm for the sliding window use case. X. Lin et al., "Continuously Maintaining Quantile Summaries of the Most Recent N Elements over a Data Stream," Proc. of the $20^{th}$ Int'l Conf. on Data Engineering (June 2001), incorporated by reference herein in its entirety, also extends the GK algorithm for the sliding window use case. These solutions for the sliding window algorithm maintain multiple summaries requiring more space.

In the sliding window scenario, it is desired to answer the quantile query for the recent N items of the data stream. Alternatively, the sliding window may refer to the items of the data stream in a recent time window. One or more embodiments of the invention allow quantile queries for the recent N items or recent time interval to be answered. A set of predefined targeted percentiles allows for more accurately answering queries for the long tail of the distribution while maintaining a small summary in memory. Using an exponential decay approach, queries are answered for the most recent items while maintaining one summary in-memory.

FIG. 1 illustrates an electronic environment 10 in which the present invention may be employed. Electronic environment 10 includes communications medium 12, authentication requestor 18, user device 19 and adaptive authentication system 13.

Communication medium 12 provides connections between adaptive authentication system 13 and authentication requestor 18. The communications medium 12 may implement a variety of protocols such as Transmission Control Protocol (with Internet Protocol) TCP/IP, User Datagram Protocol (UDP), Asynchronous Transfer Mode (ATM), Ethernet, Fiber Channel, combinations thereof, and the like. Furthermore, the communications medium 12 may include various components (e.g., cables, switches/routers, gateways/bridges, Network Attached Storage/Storage Area Network (NAS/SAN) appliances/nodes, interfaces, etc.). Moreover, the communications medium 12 is capable of having a variety of topologies (e.g., queue manager-and-spoke, ring, backbone, multi-drop, point-to-point, irregular, combinations thereof, and so on).

One or more user devices 19 may be implemented, for example, as smartphones, personal digital assistants, laptop computers, desktop computers, tablet computers, and the like constructed and arranged to submit transaction request 9 to authentication requestor 18, such as a resource provider, via communications medium 12.

Authentication requestor 18 is constructed and arranged to receive transaction 9 from a user device 19, such as requests to access data or other resources, and to send, to adaptive authentication system 13, a request 11 to authenticate the user. Authentication requestor 18 is further constructed and arranged to receive an adaptive authentication result 17 from adaptive authentication system 13 which indicates whether the user is a high risk of being a fraudulent user.

Request 11 takes the form of a message that includes various facts and their values; such messages are embedded in a payload of a data packet. Request 11 typically includes a username for the user and a timestamp indicating a time.

Adaptive authentication system 13 is constructed and arranged to receive the authentication request 11 from the authentication requestor 18. Adaptive authentication system 13 is also constructed and arranged to generate adaptive authentication result 17 based on request 11 and suspected and confirmed fraud of previous requests, a baseline profile of the user, and a baseline profile including a history of requests from a user over several previous time windows. Adaptive authentication system 13 is further constructed and arranged to send adaptive authentication result 17 to authentication requestor 18. Adaptive authentication system 13 includes adaptive authentication device 14 and storage device 15.

Storage device 15 is constructed and arranged to store database 16 which contains suspected and confirmed fraud indication for previous authentication requests. Database 16 includes a set of entries, each entry of which includes a user identifier, a time period and user data.

Adaptive authentication device 14 is constructed and arranged to perform adaptive authentication operations on request 11 according to the improved techniques and takes the form of a processing device, such as a desktop computer, laptop, server or tablet computer. Specifically, adaptive authentication device 14 receives request 11 from authentication requestor 18 and accesses the baseline profile having a user identifier matching the username of request 11. Further details concerning adaptive authentication device 14 are described below with regard to FIG. 2.

Figure 2:
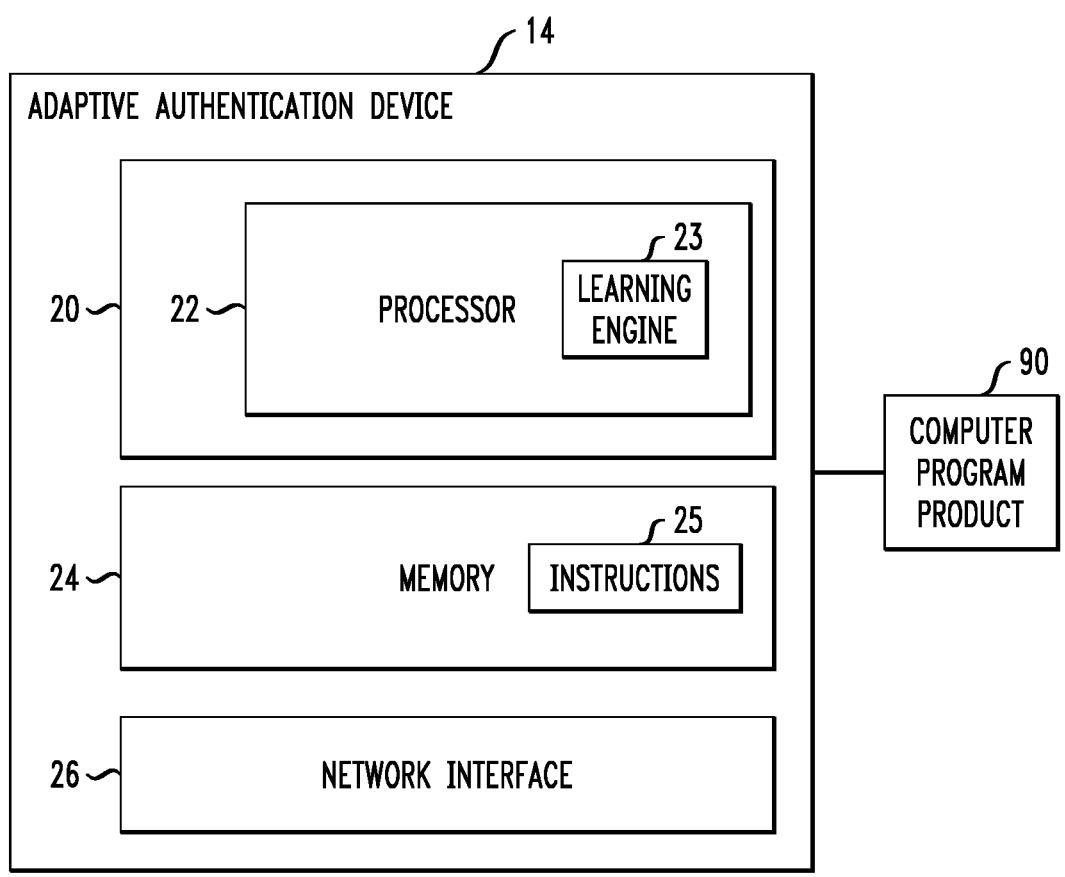
FIG. 2 illustrates components of the adaptive authentication device of FIG. 1.

FIG. 2 illustrates components of adaptive authentication device 14. Adaptive authentication device 14 includes a controller 20 which in turn includes a processor 22, a memory 24 and a network interface 26.

Memory 24 is configured to store code which includes instructions 25 to process an authentication request 11 from an authentication requestor 18. Memory 24 is further configured to store data from database 16 and request 11. Memory 24 generally takes the form of, e.g., random access memory, flash memory or a non-volatile memory.

Processor 22 can take the form of, but is not limited to, an Intel or AMD-based microprocessor Unit (MPU), and can be a single or multi-core running single or multiple threads. Processor 22 is coupled to memory 24 and is configured to execute the instructions 25 stored in memory 24. Processor 22 includes a learning engine 23. The learning engine 23 may be implemented at least in part utilizing a RSA® Core Risk Engine. See, for example, EMC Corp., Core Risk Engine, "Introduction to the Machine Learning Risk Engine," incorporated by reference herein.

The learning engine 23 is configured, for example, to assign Bayesian risk scores to transaction 9 based on one or more security threat models. Although implemented as a Bayesian learning engine in the present embodiment, other types of learning engines may be used in other embodiments. Generally, the learning engine 23 is configured to analyze incoming events based upon predefined models of threats, correlated and quantified through the assignment of Bayesian risk scores. Learning engine 23 is constructed and arranged to assign a risk score to transaction 9 based on values of attributes of previous transactions and suspected and confirmed fraud indications stored in memory 24. In this manner, the adaptive authentication system 13 includes learning engine 23 to determine a risk level based on variables associated with a user and/or client device (e.g., based on current IP address and/or IP packet round-trip delay times). In one or more embodiments, the learning engine 23 evaluates this data to arrive at an implicit "risk score" (or a preliminary assurance level inversely related to the risk score), which may be used, for example, to determine the amount of additional assurance required to authenticate the user for a given transaction. In one exemplary embodiment, the learning engine 23 evaluates a plurality of inputs by assigning a weight to each input in a Bayesian approach to generate the risk score.

The learning engine 23 is further configured to implement the quantile estimation techniques disclosed herein, as discussed further below in conjunction with FIGS. 4 and 5. As discussed hereinafter, the percentile of the risk score provides a normalized score to downstream system.

During operation, network interface 26 receives transaction 9. Upon receipt, processor 22 stores attribute values of the transaction 9 in memory 24. Learning engine 23 then executes instructions derived from instructions 25 to access these attribute values from memory 24 and assigns a risk score to transaction 20. In some arrangements, the risk score is based on a set of Bayesian weights, each of which corresponds to an attribute or feature associated with transaction 9. Learning engine 23 derives the value of each Bayesian weight from values of the attribute to which the Bayesian weight corresponds for previous transactions which are stored in database 16.

Network interface 26 is constructed and arranged to send and receive data over communications medium 12. Specifically, network interface 26 is configured to receive request 11 from authentication requestor 18 and to send adaptive authentication result 17 to authentication requestor 18 via communications medium 12.

Returning to FIG. 1, adaptive authentication result 17 indicates a likelihood that request 11 is associated with fraudulent activity. Processor 22 generates adaptive authentication result 17 based on fact values of request 11 and user data in database 16.

During operation, authentication requestor 18 sends request 11 to adaptive authentication device 14 via network interface 26. Processor 22 stores data such as the username, fact values and timestamp from request 11 in memory 24. Processor 22 accesses a database 16 and performs a lookup operation on the username; that is, processor 22 compares the username to user identifiers in each entry of database 16 and chooses those entries having a user identifier which matches the username.

The lookup operation will result in several entries from database 16, each of whose user identifier matches the username stored in memory 24 but has user data corresponding to a time interval. The time intervals of the entries of the database that have a user identifier that matches the username of request 11 are distinct and non-overlapping.

Processor 22 then combines the fact values stored in memory 24 with the fact values in the entry of database 16 that corresponds to the current time interval. For a more detailed discussion of suitable Adaptive Authentication systems, see for example, U.S. Pat. No. 8,370,389, entitled "Techniques for Authenticating Users of Massive Multi-player Online Role Playing Games Using Adaptive Authentication;" U.S. Pat. No. 8,621,586, entitled "Using Baseline Profiles In Adaptive Authentication;" U.S. Pat. No. 8,856,923, entitled "Similarity-Based Fraud Detection in Adaptive Authentication Systems;" U.S. Pat. No. 9,064,210, entitled "Semantically-Aware Behavioral Security Analysis System for Security Information and Event Management;" and U.S. Pat. No. 9,122,866, entitled "User Authentication," each incorporated by reference herein.

The adaptive authentication application is capable of being delivered to and installed on the adaptive authentication device 14 from a computer program product 90. As discussed further below, such a computer program product 90 includes a non-transitory computer readable storage medium which stores, in a non-volatile manner, instructions for performing the adaptive authentication operations. Examples of suitable computer readable storage media include CD-ROM, magnetic disk or tape cartridges, flash memory, disk memory, and the like.

Figure 3A:
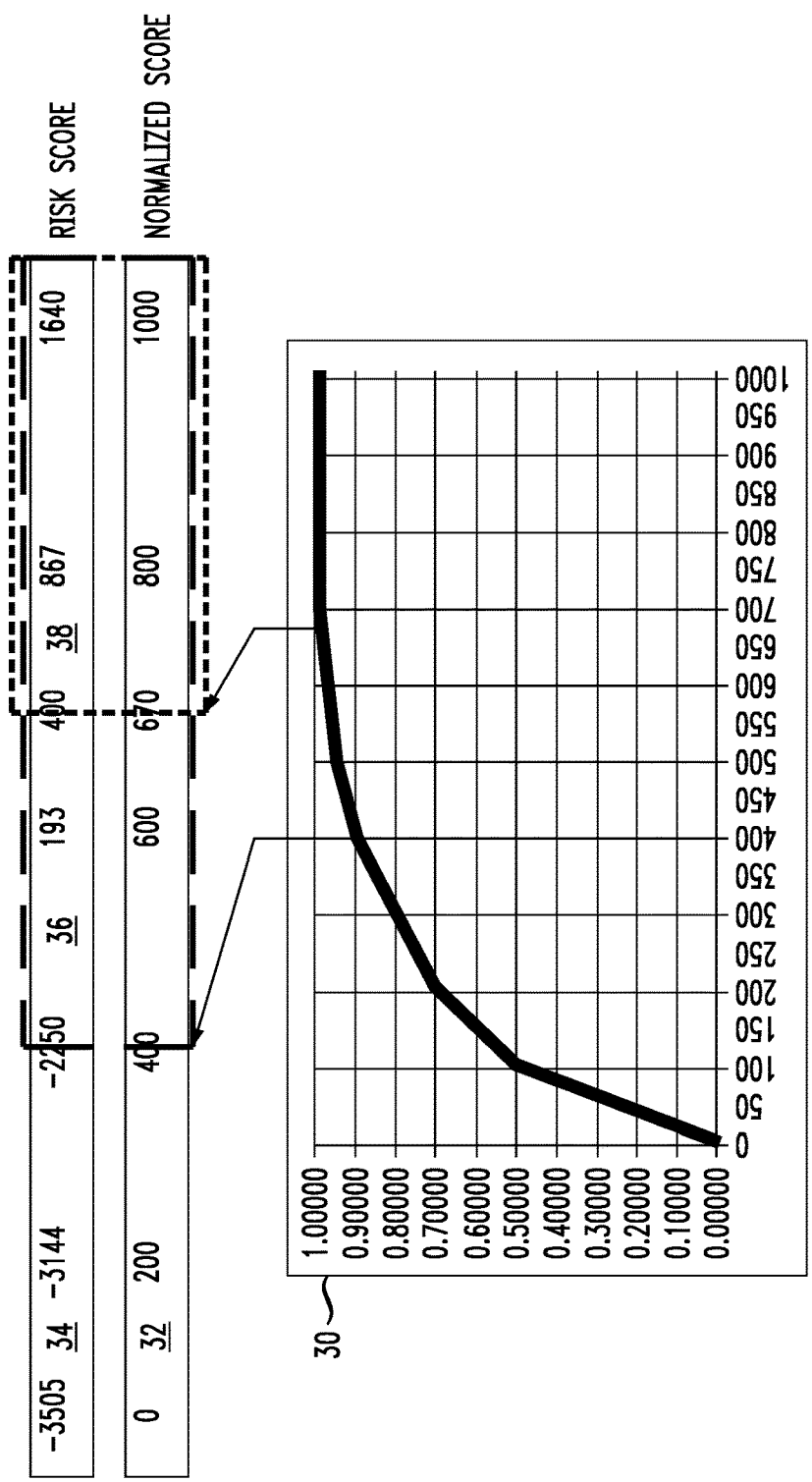
FIG. 3A illustrates an exemplary ranking scheme, according to one embodiment of the invention.

FIG. 3A illustrates an example of an exemplary ranking scheme 30, according to one embodiment of the invention, for use in selecting the riskiest transactions from a large set of transactions stored in memory 24. In the exemplary implementation of FIG. 3A, ranking scheme 30 represents a scale from 0-1000 of risk scores in increments of 10 by which raw risk scores 34 are mapped to scaled risk scores 32. Note that the range of values of raw risk scores 34 can change from day-to-day, while the definition of the scaled risk scores 32 remains fixed.

Each scaled risk score 32 represents a percentile of risk scores. For example, as shown in the graph of FIG. 3A, a transaction having a scaled risk score of 100 represents a transaction having a risk score in the 50th percentile of risk scores of all transactions. Additionally, a scaled risk score of 200 represents the 70th percentile, a scaled risk score of 300 represents the 80th percentile, a scaled risk score of 400 represents the 90th percentile, a scaled risk score of 500 represents the 95th percentile, a scaled risk score of 700 represents the 99th percentile, and a scaled risk score of 900 represents the 99.7th percentile. Under this representative scale, previous transactions having a scaled risk score of 400 or higher are considered risky transactions 36. Further, transactions having a risk score of 670 or above are considered the riskiest transactions 38.

As noted above, quantiles divide the range of a distribution into contiguous intervals with substantially equal probabilities. The disclosed techniques for quantile estimation based on a space efficient representation of the values distribution allows a quantile query to be answered in a space efficient manner. In the targeted quantile problem, the accuracy of the quantile estimation varies for different percentiles.

Figure 3B:
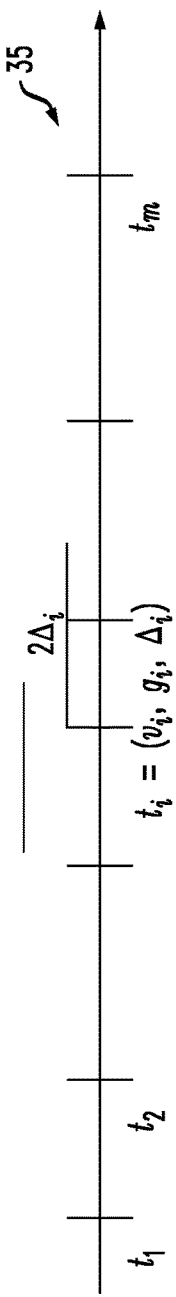
FIG. 3B illustrates a summary of ordered tuples in accordance with an embodiment of the invention.

FIG. 3B illustrates a summary 35 of ordered tuples in accordance with the teachings of the CKMS algorithm. The Summary (S(n)) 35 is maintained in memory for a targeted quantile set $T=\{((\emptyset, \varepsilon_j)\}$, where $\varepsilon_j$ indicates the desired accuracy for a given percentile, $\emptyset_j$. Generally, each risk score is initially stored in the sorted Summary (S(n)) 35 as a tuple, $t_i$, of values. The Summary S(n) is later compressed, as discussed further below, so that the Summary S(n) maintains only the tuples required to answer queries in the required accuracy. The Summary S(n) may not contain a tuple for a specific value of risk score. For instance, at a certain time two risk scores were inserted to the Summary S(n) with values 1000 and 1001. After compression, a tuple may be maintained in the Summary S(n) only for value of 1001. Maintaining a separate tuple for the value of 1000 was not required in order to answer a quantile query with the desired accuracy and therefore the two tuples were merged.

Each exemplary tuple, $t_i$, comprises:

$v_i$–value, $$g_i = r_{min}(v_i) - r_{min}(v_{i-1}),$$

where $g_i$ is generally an item count and indicates the difference between the lowest possible rank of item i and i−1, $$\Delta_i = r_{max}(v_i) - r_{min}(v_i),$$

where $\Delta_i$ is generally a factor of the stream size at the time of tuple creation, and indicates the difference between the maximal possible rank of item i and minimal possible rank of item i, and where:

$$r_{min}(v_i) = \sum_1^i g_j,$$

and $$r_{min}(v_i) \leq \text{rank}(v_i) \leq r_{min}(v_i) + \Delta_i.$$

Figure 4:
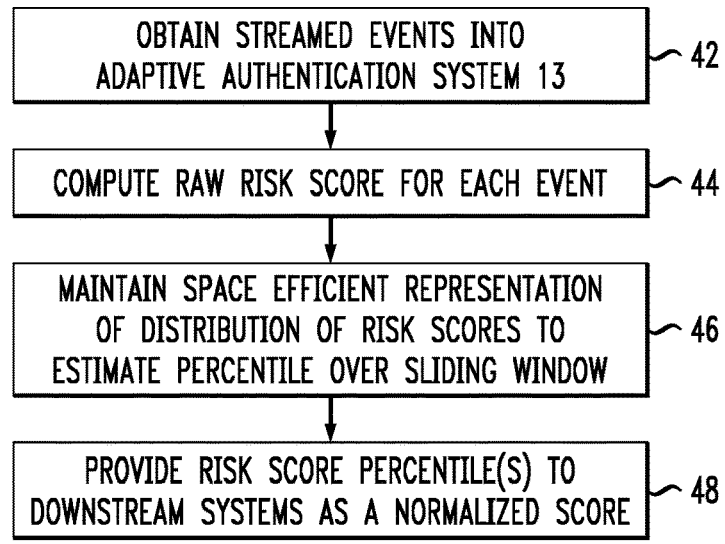
FIG. 4 is a flow chart illustrating an exemplary implementation of quantile estimation process, according to one embodiment of the invention.

FIG. 4 is a flow chart illustrating an exemplary implementation of quantile estimation process 40, according to one embodiment of the invention. As shown in FIG. 4, the exemplary quantile estimation process 40 initially obtains streamed events into the adaptive authentication system 13 during step 42. In one or more embodiments, the streamed events comprise, for example, credit card transactions and/or new Internet Protocol (IP) sessions.

Thereafter, the exemplary quantile estimation process 40 computes a raw risk score 34 for each event during step 44. As noted above, the raw risk scores 34 are not scaled and may not be meaningful to a downstream system or analyst. As shown in FIG. 4, a space efficient representation of the distribution of risk scores is maintained during step 46 to estimate percentile over sliding window, as discussed further below in conjunction with FIG. 5. Generally, the computed raw risk scores 24 are stored in a summary, which provides a distribution of the scores.

Finally, the exemplary quantile estimation process 40 provides the computed risk score percentile to one or more downstream systems as a normalized risk score (which gives meaning to the computed raw risk scores 34), during step 48.

Figure 5:
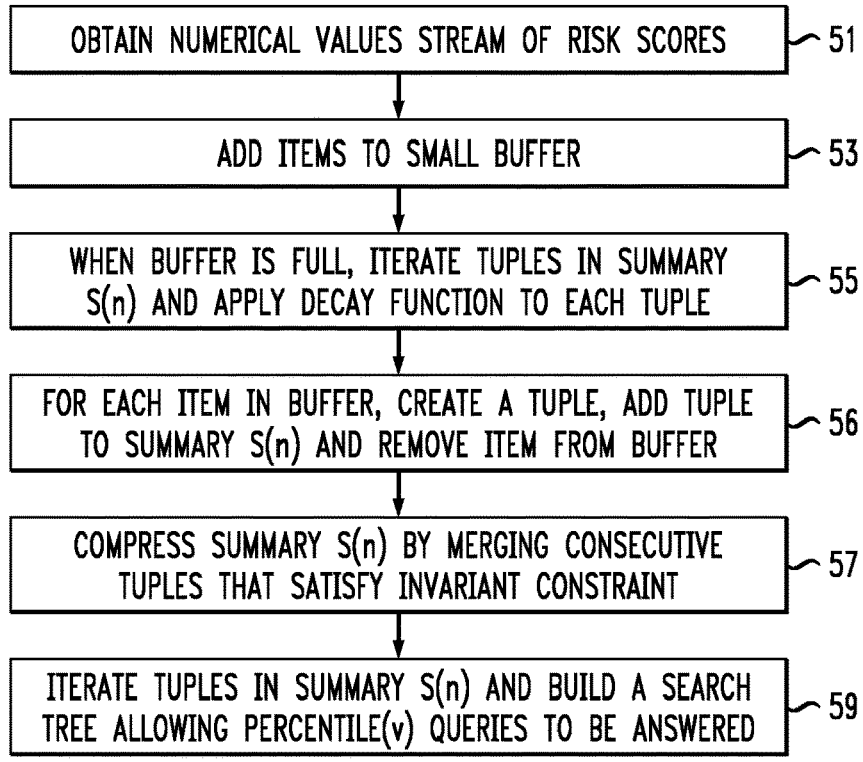
FIG. 5 is a flow chart illustrating an exemplary implementation of a decay function-based quantile estimation process according to one embodiment of the invention.

FIG. 5 is a flow chart illustrating an exemplary implementation of a decay function-based quantile estimation process 50 according to one embodiment of the invention. As shown in FIG. 5, the exemplary decay function-based quantile estimation process 50 initially obtains a numerical values stream of risk scores during step 51.

Thereafter, the exemplary decay function-based quantile estimation process 50 adds the items to a small buffer during step 53, in a similar manner as the CKMS algorithm. As shown in FIG. 5, when the buffer is full, the exemplary decay function-based quantile estimation process 50 iterates the tuples in the Summary S(n) to update the counts and maximum rank bounds, by applying a decay function to each tuple during step 55.

As noted above in conjunction with FIG. 3B, existing techniques, such as the CKMS algorithm, each risk score is stored as a tuple of three values:

$$t_i = (v_i, g_i, \Delta_i).$$

In one or more embodiments of the invention, the tuples are extended to store five values, as follows:

$$t_i = (v_i, g_i, \Delta_i, n, r_i),$$

where n is number of items in the data stream at the time the tuple was created (and provides an indication of time) and $r_i$ is the minimal rank bound of tuple i−1:

$$r_i = \sum_{j=1}^{i-1} g_j.$$

In one or more embodiments of the invention, the conventional CKMS operations are extended to process the five values, as follows:

Insert Operation:

$$(v, 1, \lfloor f(r_i, n) \rfloor - 1, n, r_i).$$

where $f(r_i, n)$ is an error function used by the CKMS algorithm.

Compress Operation:

Two consecutive tuples i and i+1 satisfying the following inequality (expressing an invariant constraint):

$$(g_i + g_{i+1} + \Delta_{i+1}) \leq f(r_i, n).$$

are replaced by the following tuple:

$$(v_{i+1}, g_i + g_{i+1}, \Delta_{i+1}, n'_{i+1}, r'_i).$$

The decay function is applied to each tuple during step 55, as follows:

$$g_i = g_i \times df;$$

$$\Delta_i = f(r'_i \times df, n'_i \times df);$$

$$n'_i = n'_i \times df; \text{ and}$$

$$r'_i = r'_i \times df,$$

where $df = e^{-dt/T}$, where T is the window size and dt is the time since last update. In this manner, the item count and stream size in the Summary S(n) are decreased by the exponential decay factor, df.

When the decay function is applied to the tuples in the Summary S(n), the n and $r_i$ values stored in the tuple are used to update $\Delta_i$. The n and $r_i$ values are the n and $r_i$ values at the time of the creation of the tuple. The n and $r_i$ values are also updated the decay function is applied to the tuples, as noted in the above equations.

Thereafter, for each item in the buffer, the decay function-based quantile estimation process 50 creates a tuple, adds the tuple to the Summary S(n) and removes the item from the buffer during step 56. Each new tuple is of the form:

$$(v_i, g_i, \Delta_i, n, r_i), \text{ such as:}$$

$$(v, 1, \lfloor f(r_i, n) \rfloor - 1, n, r_i).$$

The exemplary decay function-based quantile estimation process 50 then compresses the Summary S(n) by merging consecutive tuples that satisfy the above-noted invariant constraint for compression operations, during step 57. Thus, two consecutive tuples i and i+1 satisfying the following inequality (expressing the invariant constraint):

$$(g_i + g_{i+1} + \Delta_{i+1}) \leq f(r_i, n).$$

are merged and replaced by the following tuple:

$$(v_{i+1}, g_i + g_{i+1}, \Delta_{i+1}, n'_{i+1}, r'_i).$$

Finally, during step 59, the exemplary decay function-based quantile estimation process 50 iterates the tuples in the Summary S(n) and builds a search tree allowing percentile (v) queries (e.g., to retrieve the percentile for the value v) to be answered, for example, of the following form, in a similar manner as the CKMS algorithm:

Query Operation:

$$\text{quantile}(\emptyset) = v_{i-1},$$

where i is the smallest index such that $(r_i + g_i + \Delta_i) < \emptyset n + 1/2f$ ($\emptyset n$, n).

For a given value, v, the percentile of v is the percentile ($v_i$) where $v_i$ is the largest value that is smaller than v.

The search tree is built during step 59, as follows: for each tuple in Summary S(n), add an entry to the search tree of the form [$v_i$, percentile($v_i$)] where:

$$r_{min}(v_i) = \sum_{1}^{i} g_j,$$

$$percentile(v_i) = (r_i + g_i + \Delta_i + f(r_{min}(v_i), n)/2 - 1)/n.$$

According to one aspect of the invention, both percentile and quantile queries can be processed. Quantiles are cut-points dividing the range of a probability distribution into contiguous intervals with equal probabilities, or dividing the observations in a sample in the same way. A quantile query is typically of the form: for a given percentile, e.g., 20%, what is the value (cut point) at which 20% of the observations are less than this value.

A percentile (or a centile) is a measure used in statistics indicating the value below which a given percentage of observations in a group of observations fall. For example, the 20th percentile is the value (or score) below which 20% of the observations may be found. A percentile query is typically of the form: for a given value what is the percentage of observations which are less than this value.

In one or more embodiments, the decay function-based quantile estimation process 50 estimates quantiles and percentile estimation is built on top.

As noted above in conjunction with FIG. 4, the computed risk score percentile can be provided to one or more downstream systems or analysts as a normalized risk score (giving meaning to the computed raw risk scores 34).

In one or more embodiments, quantiles and/or percentiles are computed within a bounded error using a smaller space requirement and less time than conventional techniques. In at least one embodiment, quantiles are computed in one-pass over the stream of data. In addition, one or more aspects of the invention recognize that the distributions change over time, as more transactions arrive. Thus, in one or more embodiments, a sliding window is employed with the recent N items of the data stream or the items within a predefined recent time window.

Figure 6:
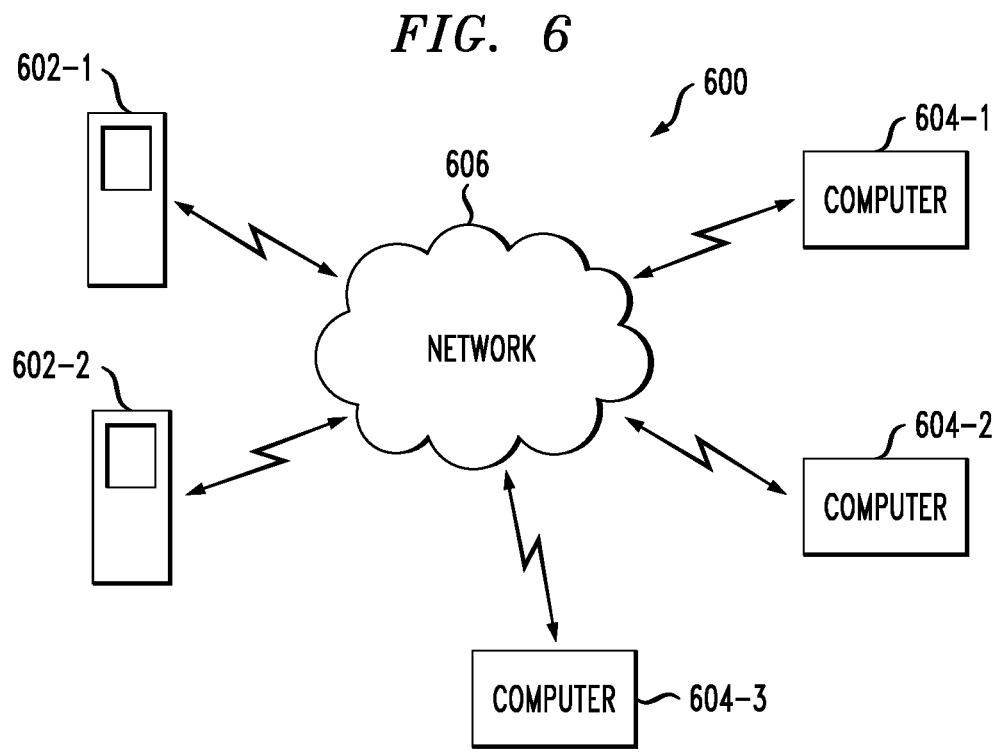
FIG. 6 is a diagram illustrating an example embodiment of communication systems that may incorporate functionality according to one or more embodiments of the invention.

FIG. 6 is a diagram illustrating an example embodiment of communication systems that may incorporate functionality according to one or more embodiments of the invention. As described herein, techniques for performing quantile estimation with a sliding window approach of the type associated with one or more embodiments of the invention may be implemented in a wide variety of different applications. By way merely of illustration, one exemplary communication system application that may incorporate such techniques will now be described with reference to FIG. 6.

As depicted in FIG. 6, a communication system 600 comprises a plurality of mobile devices 602-1 and 602-2 and computers 604-1, 604-2 and 604-3, configured to communicate with one another over a network 606. Any two or more of the devices 602 and 604 may correspond to the exemplary adaptive authentication system 13, authentication requestor 18, or user device 19 in FIG. 1 and can be configured to implement at least one embodiment of the invention, as described herein. It is also to be appreciated, however, that the techniques disclosed herein can be implemented in numerous other applications. For example, while FIG. 6 depicts network 606 as a wireless network, it is to be appreciated that one or more embodiments of the invention can be implemented in connection with a wired network.

Further, aspects of the present invention are described herein with reference to flowchart illustrations, communication diagrams and/or block diagrams of methods, apparatus, systems and computer program products according to embodiments of the invention. It is to be appreciated that each block of the flowchart illustrations and/or block diagrams, and combinations of blocks in the flowchart illustrations and/or block diagrams, can be implemented by computer program instructions. These computer program instructions may be provided to a processor of a special purpose computer or other specialized programmable data processing apparatus to produce a machine, such that the instructions, which execute via the processor of the computer or other specialized programmable data processing apparatus, implement the functions/acts specified in the flowchart and/or block diagram block or blocks.

As further described herein, such computer program instructions may also be stored in a computer readable medium that can direct a computer, or other programmable devices to function in a particular manner, such that the instructions stored in the computer readable medium produce an article of manufacture including instructions which implement the function/act specified in the flowchart and/or block diagram block or blocks. Accordingly, as further detailed below, at least one embodiment of the invention includes an article of manufacture tangibly embodying computer readable instructions which, when implemented, cause a device to carry out techniques described herein.

The computer program instructions may also be loaded onto a computer or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart, communication diagrams and block diagrams in the figures illustrate the architecture, functionality, and operation of possible implementations of systems, methods and computer program products according to various embodiments of the present invention. In this regard, each block in the flowchart, communication diagrams or block diagrams may represent a component, segment, or portion of code, which comprises at least one executable instruction for implementing the specified logical function(s). It should be noted that the functions noted in the block may occur out of the order noted in the figures.

Additionally, the techniques detailed herein can also be implemented via a computer program product that includes computer useable program code stored in a computer readable storage medium in a data processing system, wherein the computer useable program code was downloaded over a network from a remote data processing system. The computer program product can also include, for example, computer useable program code that is stored in a computer readable storage medium in a server data processing system, wherein the computer useable program code is downloaded over a network to a remote data processing system for use in a computer readable storage medium with the remote system.

As will be appreciated by one skilled in the art, aspects of the present invention may take the form of an entirely hardware embodiment, an entirely software embodiment (including firmware, resident software, micro-code, etc.) or an embodiment combining software and hardware aspects that may be referred to herein as a "system."

Figure 7:
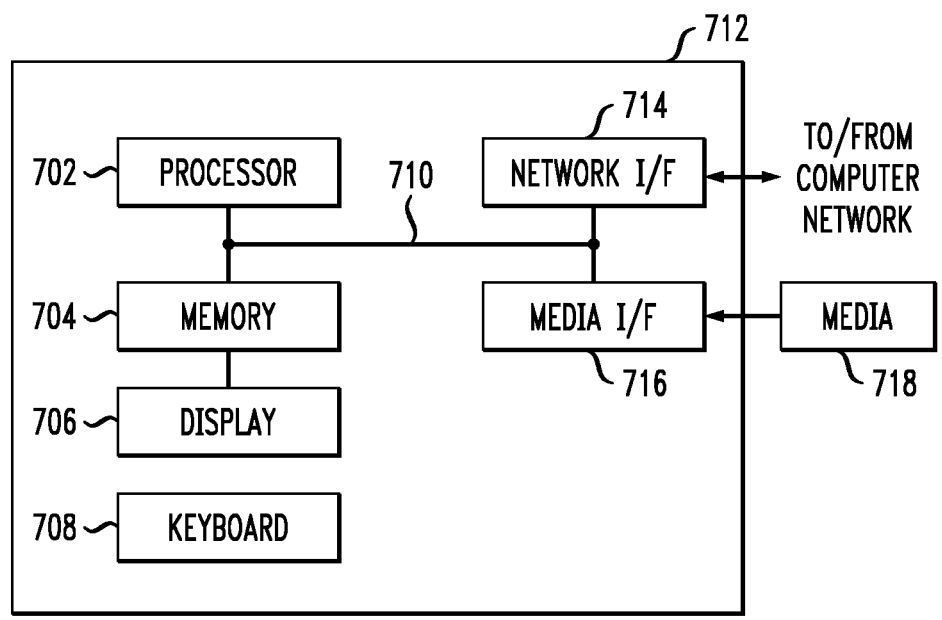
FIG. 7 is a system diagram of an exemplary device on which at least one embodiment of the invention can be implemented.

FIG. 7 is a system diagram of an exemplary device (such as the exemplary adaptive authentication system 13 of FIG. 1, for example) on which at least one embodiment of the invention can be implemented. As depicted in FIG. 7, an example implementation employs, for example, a processor 702, a memory 704, and an input/output interface formed, for example, by a display 706 and a keyboard 708. The term "processor" as used herein can include one of multiple processing device(s), such as, for example, one that includes a central processing unit (CPU), a microprocessor, a microcontroller, an application-specific integrated circuit (ASIC), a field-programmable gate array (FPGA), and/or other forms of processing circuitry. The term "memory" includes memory associated with a processor or CPU, such as, for example, random access memory (RAM), read only memory (ROM), a fixed memory device (for example, a hard drive), a removable memory device (for example, a diskette), a flash memory, etc. Further, the phrase "input/output interface," as used herein, includes a mechanism for inputting data to the processing unit (for example, a graphical user interface) and a mechanism for providing results associated with the processing unit (for example, a display).

The processor 702, memory 704, and input/output interface such as display 706 and keyboard 708 can be interconnected, for example, via bus 710 as part of a data processing unit 712. Suitable interconnections via bus 710, can also be provided to a network interface 714 (such as a network card), which can be provided to interface with a computer network, and to a media interface 716 (such as a diskette or compact disc read-only memory (CD-ROM) drive), which can be provided to interface with media 718.

Accordingly, computer software including instructions or code for carrying out the techniques detailed herein can be stored in associated memory devices (for example, ROM, fixed or removable memory) and, when ready to be utilized, loaded in part or in whole (for example, into RAM) and implemented by a CPU. Such software can include firmware, resident software, microcode, etc.

As noted above, a data processing system suitable for storing and/or executing program code includes at least one processor 702 coupled directly or indirectly to memory elements 704 through a system bus 710. The memory elements can include local memory employed during actual implementation of the program code, bulk storage, and cache memories which provide temporary storage of at least some program code in order to reduce the number of times code must be retrieved from bulk storage during implementation. Also, input/output (I/O) devices such as keyboards 708, displays 706, and pointing devices, can be coupled to the system either directly (such as via bus 710) or through intervening I/O controllers.

Network adapters such as network interface 714 (for example, a modem, a cable modem, an Ethernet card, etc.) can also be coupled to the system to enable the data processing system to become coupled to other data processing systems or remote printers or storage devices through intervening private or public networks.

As used herein, a "server" includes a physical data processing system (such as system 712 as depicted in FIG. 7) running a server program. It will be understood that such a physical server may or may not include a display and keyboard.

As noted, at least one embodiment of the invention can take the form of a computer program product embodied in a computer readable medium having computer readable program code embodied thereon. As will be appreciated, multiple combinations of computer readable media may be utilized. The computer readable medium can include a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. Examples include an electrical connection having one or more wires, a portable computer diskette, a hard disk, RAM, ROM, an erasable programmable read-only memory (EPROM), flash memory, an optical fiber, a portable CD-ROM, an optical storage device, a magnetic storage device, and/or any suitable combination of the foregoing. More generally, a computer readable storage medium may be any tangible medium that can contain, or store a program for use by or in connection with an instruction execution system, apparatus, or device.

Additionally, a computer readable signal medium may include a propagated data signal with computer readable program code embodied therein, for example, in baseband or as part of a carrier wave. Such a propagated signal may take any of a variety of forms such as, for example, electromagnetic, optical, or a suitable combination thereof. More generally, a computer readable signal medium may be any computer readable medium that is not a computer readable storage medium and that can communicate, propagate, or transport a program for use by or in connection with an instruction execution system, apparatus, or device.

Program code embodied on a computer readable medium can be transmitted using an appropriate medium such as, for example, wireless, wireline, optical fiber cable, radio frequency (RF), and/or a suitable combination of the foregoing. Computer program code for carrying out operations in accordance with one or more embodiments of the invention can be written in any combination of at least one programming language, including an object oriented programming language, and conventional procedural programming languages. The program code may execute entirely on a user's computer, partly on a user's computer, as a stand-alone software package, partly on a user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In light of the above descriptions, it should be understood that the components illustrated herein can be implemented in various forms of hardware, software, or combinations thereof, for example, application specific integrated circuit(s) (ASICS), functional circuitry, an appropriately programmed digital computer with associated memory, etc.

Terminology used herein is for the purpose of describing particular embodiments only and is not intended to be limiting of the invention. For example, the singular forms "a," "an" and "the" are intended to include the plural forms as well, unless clearly indicated otherwise. It will be further understood that the terms "comprises" and/or "comprising," as used herein, specify the presence of stated features, steps, operations, elements, and/or components, but do not preclude the presence or addition of another feature, step, operation, element, component, and/or group thereof.

Also, it should again be emphasized that the above-described embodiments of the invention are presented for purposes of illustration only. Many variations and other alternative embodiments may be used. For example, the techniques are applicable to a wide variety of other types of communication systems and computing devices that can benefit from the disclosed quantile and/or percentile estimation with a sliding window approach. Accordingly, the particular illustrative configurations of system and device elements detailed herein can be varied in other embodiments. These and numerous other alternative embodiments within the scope of the appended claims will be readily apparent to those skilled in the art.

What is claimed is:

1. A method, comprising the steps of:
    obtaining a stream of data values;
    obtaining a summary of a distribution of processed data values, wherein the processed data values correspond to data values of said stream that were previously: (i) streamed to a buffer and (ii) removed from the buffer, wherein said data values are stored in said summary as a tuple, wherein a given tuple, $t_i$, comprises a given data value, an item count, a difference value based on a size of said summary at a time said tuple is created, a number of items in said stream at said time said tuple is created, and a minimal rank bound of tuple i−1;
    adding streamed data values of said stream to said buffer; and
    when the buffer reaches a predefined fullness threshold, performing the following steps:
    processing tuples in the summary to apply a decay function to each tuple using said number of items in said stream and said minimal rank bound;
    for each item in the buffer: (i) creating a tuple, (ii) adding the tuple to the summary, and (iii) removing the item from the buffer; and
    building a search tree that is used to process one or more of percentile queries and quantile queries, wherein building said search tree comprises adding an entry to the search tree for each tuple in the summary.

2. The method of claim 1, wherein, for each tuple in the summary, having a given data value, $v_i$, the entry to the search tree is of the form ($v_i$, percentile($v_i$)).

3. The method of claim 1, wherein, for a given data value, v, a percentile of the given data value is the percentile($v_i$) where $v_i$ is a largest value that is smaller than v.

4. The method of claim 1, wherein, for a given percentile, a quantile is the value, v, at which the given percentile of the observations are less than v.

5. The method of claim 1, wherein a result of said one or more of said percentile queries and said quantile queries is provided to one or more of a downstream system and an analyst to allow said given data value to be further analyzed.

6. The method of claim 1, further comprising the step of compressing said summary by merging consecutive tuples that satisfy a predefined invariant constraint.

7. The method of claim 1, wherein said decay function maintains one or more of a predefined recent number of items and items or a predefined recent time window of items in said summary.

8. The method of claim 1, wherein said decay function comprises an exponential decay function based on a window size and a time since a last update of said summary.

9. The method of claim 1, wherein said stream of data values comprises a stream of risk scores for a plurality of transactions.

10. A computer program product, comprising a non-transitory machine-readable storage medium having encoded therein executable code of one or more software programs, wherein the one or more software programs when executed by at least one processing device perform the following steps: obtaining a stream of data values; obtaining a summary of a distribution of processed data values, wherein the processed data values correspond to data values of said stream that were previously: (i) streamed to a buffer and (ii) removed from the buffer, wherein said data values are stored in said summary as a tuple, wherein a given tuple, t comprises a given data value, an item count, a difference value based on a size of said summary at a time said tuple is created, a number of items in said stream at said time said tuple is created, and a minimal rank bound of tuple i−1; adding streamed data values of said steam to said buffer; and when the buffer reaches a predefined fullness threshold, performing the following steps: processing tuples in the summary to apply a decay function to each tuple using said number of items in said stream and said minimal rank bound; for each item in the buffer: (i) creating a tuple, (ii) adding the tuple to the summary, and (iii) removing the item from the buffer; and building a search tree that is used to process one or more of percentile queries and quantile queries, wherein building said search tree comprises adding an entry to the search tree for each tuple ii the summary.

11. The computer program product of claim 10, wherein, for each tuple in the summary, having a given data value, $v_i$, the entry to the search tree is of the form ($v_i$, percentile ($v_i$)).

12. The computer program product of claim 10, wherein a result of said one or more of said percentile queries and said quantile queries is provided to one or more of a downstream system and an analyst to allow said given data value to be further analyzed.

13. The computer program product of claim 10, further comprising the step of compressing said summary by merging consecutive tuples that satisfy a predefined invariant constraint.

14. The computer program product of claim 10, wherein said decay function maintains one or more of a predefined recent number of items and a predefined recent time window of items in said summary.

15. The computer program product of claim 10, wherein said decay function comprises an exponential decay function based on a window size and a time since a last update of said summary.

16. A system, comprising:
    a memory; and
    at least one processing device, coupled to the memory, operative to implement the following steps:
    obtaining a stream of data values;
    obtaining a summary of a distribution of processed data values, wherein the processed data values correspond to data values of said stream that were previously: (i) streamed to a buffer and (ii) removed from the buffer, wherein said data values are stored in said summary as a tuple, wherein a given tuple, $t_i$, comprises a given data value, an item count, a difference value based on a size of said summary at a time said tuple is created, a number of items in said stream at said time said tuple is created, and a minimal rank bound of tuple i−1;

adding streamed data values of said stream to said buffer; and when the buffer reaches a predefined fullness threshold, performing the following steps:

processing tuples in the summary to apply a decay function to each tuple using said number of items in said stream and said minimal rank bound;

for each item in the buffer: (i) creating a tuple, (ii) adding the tuple to the summary, and (iii) removing the item from the buffer; and building a search tree that is used to process one or more of percentile queries and quantile queries, wherein building said search tree comprises adding an entry to the search tree for each tuple in the summary.

17. The system of claim 16, wherein, for each tuple in the summary, having a given data value, $v_i$, the entry to the search tree is of the form ($v_i$, percentile($v_i$)).

18. The system of claim 16, wherein a result of said one or more of said percentile queries and said quantile queries is provided to one or more of a downstream system and an analyst to allow said given data value to be further analyzed.

19. The system of claim 16, further comprising the step of compressing said summary by merging consecutive tuples that satisfy a predefined invariant constraint.

20. The system of claim 16, wherein said decay function maintains one or more of a predefined recent number of items or items and a predefined recent time window of items in said summary.

21. The system of claim 16, wherein said decay function comprises an exponential decay function based on a window size and a time since a last update of said summary.

22. The system of claim 16, wherein said stream of data values comprises a stream of risk scores for a plurality of transactions.

* * * * *